Nov. 10, 1925 Re. 16,202
B. BRIODY
ROADWAY JOINT
Original Filed July 21, 1919
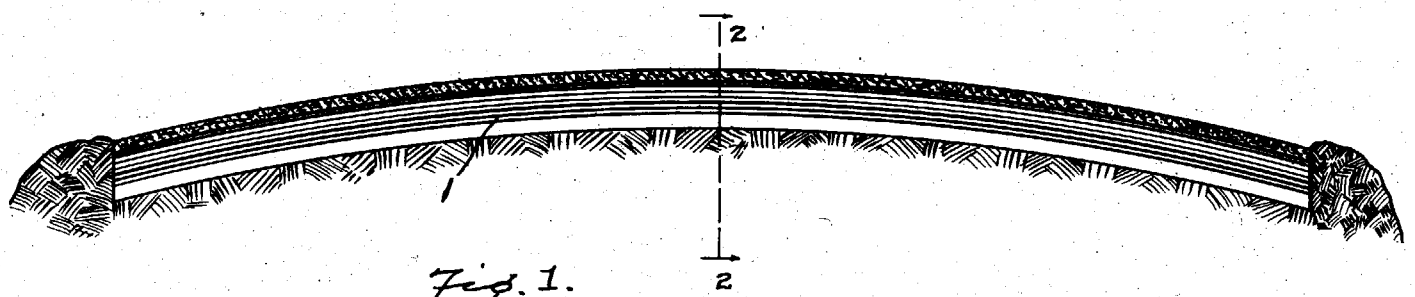
Fig. 1.
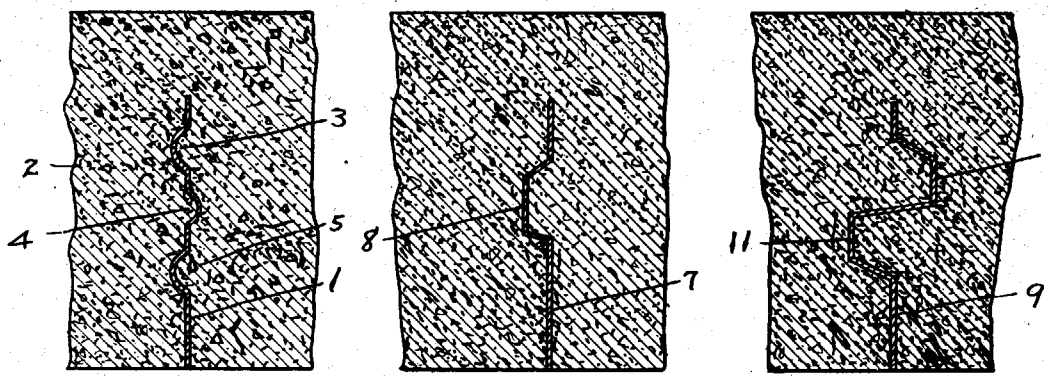
Fig. 2.
Fig. 3.
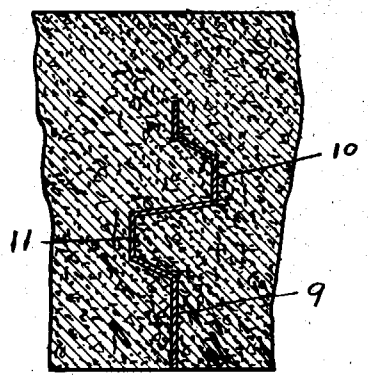
Fig. 4.
INVENTOR
Bernard Briody
BY
Edward W. Pagelsen
ATTORNEY Reissued Nov. 10, 1925.

Re. 16,202

UNITED STATES PATENT OFFICE.

BERNARD BRIODY, OF YOUNGSTOWN, OHIO, ASSIGNOR TO TRUSCON STEEL COMPANY, A CORPORATION OF MICHIGAN.

ROADWAY JOINT.

Original No. 1,537,063, dated May 12, 1925, Serial No. 312,164, filed July 21, 1919. Application for reissue filed August 29, 1925. Serial No. 53,419.

*To all whom it may concern:*

Be it known that I, BERNARD BRIODY, a citizen of the United States, and formerly residing at Chicago, in the county of Cook and State of Illinois, now residing at Youngstown, in the county of Mahoning and State of Ohio, have invented a new and Improved Roadway Joint, of which the following is a specification.

This invention relates to concrete pavements and to the means for preventing said pavements from cracking irregularly and at varying angles to the sides, and its object is to provide means for causing the concrete roadway to crack along a predetermined line when the contractual stresses within the body of the concrete become too great for the tensional strength of the concrete, and to prevent the end of one section of roadway from lifting up above the adjacent end of the adjoining section.

This invention consists in a strip of metal embedded vertically in the pavement, and being of less depth than the body of the concrete so that there will be some concrete above the top edge of the strip. Thru the use of my invention, the roadway remains perfectly smooth and unbroken until stresses are set up in the concrete. When sufficiently excessive stresses do occur to cause cracks, such cracks will usually occur along a straight line, predetermined thru the location of said metal, the crack occurring immediately above and in line with said metal.

This strip of metal is corrugated longitudinally. The invention further consists in forming the corrugations in the metal strip, when these are used, of such size and form that the tongues of concrete extending into them will be sufficiently strong to carry the end of the slab from which they extend.

In the accompanying drawing, Fig. 1 is a transverse section of a highway having a concrete pavement provided with my improved joint. Fig. 2 is a section on the line 2—2 of Fig. 1. Figs. 3 and 4 are similar sections showing modified forms of joints.

Similar reference characters refer to like parts throughout the several views.

The older concrete roadways are commonly disfigured by irregular cracks, which, if not attended to, soon develop into ruts. In an effort to overcome this objection, parallel metal bars have been embedded in the concrete roadway at the surface, these bars, and the asphalt or tar between them, constituting what are known as expansion joints, the chief aim, however, being to protect the edges of the concrete. These joints are placed so as to divide the roadway into sections of desired location and area.

I have found that when each bar of such protection joint is secured to the adjacent concrete, the movement between the bars is very small and that the expansion and contraction of the roadway need not be taken into account in any but the most rigorous climates. The use of these protection joints results in ridges on the wearing surface of the roadway, which become so objectionable that in some States the use of these joints is forbidden, the resulting ridges being a serious source of annoyance.

The change in a section of roadway because of the change in its temperature is extremely slight for the reason that the body of the slab does not vary in temperature to any great extent, but rather, because of its conductivity, remains at nearly the temperature of the earth beneath it.

Under certain conditions, however, there is a slight contraction of the material composing the slab, usually in very cold weather, and the slab may crack. I have, therefore, provided a strip of sheet metal, whose width is less than the thickness of the slab, which I embed in the roadway, the lower edge of the strip being preferably at the bottom face of the slab, but the upper edge always somewhat below its upper face. If shrinkage sufficient to crack the slab does occur, the break is usually along the upper edge of the strip where the concrete is weakest, and, being a straight line, can be filled with tar or asphalt with the least amount of labor. The roadway however wears evenly, and the annoying bumps of the present roadways are avoided.

The main reason for the breakage of concrete roadways probably is the uneven stresses to which the roadway is subjected from above and below. As a rule, because of uneven fills, uneven excavations, and uneven density of the sub-grade, the upward resistance to the pressure by the pavement causes shearing stresses to be set up when heavy loads are hauled over the roadway, often resulting in cracks. My improved joint does not prevent these cracks but it does localize them. Where the sub-grade is not perfectly drained, heavy frost often causes an upheaval of the pavement and cracking results. My improved joint not only localizes the cracks but causes the pavement to settle back in alinement by holding the edges of the sections into which the pavement is broken in their original relative positions.

In Fig. 2 the strip 1 is shown embedded in the concrete 2, and to be corrugated to form longitudinal ribs 3, 4 and 5 on the concrete. When the pavement is depressed by an unusual load or lifted by frozen ground, the projecting ribs of the concrete and the corrugations of the metal will cause the adjacent ends of the sections of the pavement to rise and fall together, the corrugations of the strip and the ribs on the concrete serving as keys to hold the ends of the sections in alinement. The width of the strip is less than the depth of the pavement so that there will be no indications of the joint until the pavement cracks.

In Fig. 3, the strip 7 has a single corrugation 8, while in Fig. 4 the strip 9 has two corrugations 10 and 11, which corrugations in each case act as molds for forming the interlocking tongues and grooves on the concrete of the pavement. The strip will, of course, where placed transversely to the roadway, be curved to the same arc as the bottom of the pavement if that is crowned and the depth of the strip and the shape and size of the corrugations may be varied as desired by those skilled in the art without departing from the spirit of my invention as set forth in the following claims.

I claim:—

1. In a roadway, a body of concrete constituting the pavement of the roadway, and a strip of metal embedded in the concrete and corrugated longitudinally, whose length is the width of the pavement and whose upper edge is below the surface of the roadway, the tongues of concrete formed by the corrugations on the adjacent road sections serving to keep said sections in alinement.

2. A divider for use in concrete and similar roadways consisting of a strip of metal having a straight portion at its top edge and being corrugated intermediate its top and bottom edges and having both of its sides in contact with the concrete.

3. A divider for plastic bodies consisting of an imperforate strip of metal having straight top and bottom edges and having a longitudinally extending corrugation between said edges and having both sides in contact with the plastic material.

4. A divider for use in concrete and similar roadways, consisting of a metal strip embedded in the roadway material with both its sides in contact with or adjacent to the roadway material, and having a substantially straight top edge so located below the surface of the roadway as to tend to localize cracking in the roadway above and along the line of said edge, and being so corrugated intermediate its top and bottom edges as to tend to keep adjacent sections of the roadway in alinement.

5. In a roadway, a body of concrete constituting the pavement of the roadway, and a longitudinally corrugated strip of metal so embedded in the roadway that its upper edge is below the surface thereof, the tongues of concrete formed by the corrugations of said strip on adjacent sections of the roadway serving to keep the sections in alinement.

BERNARD BRIODY.